Jan. 31, 1967 J. G. HUMPHREY 3,301,951
NON-BLOCKING KEYED AUTOMATIC GAIN CONTROL SYSTEM
Filed Nov. 18, 1963
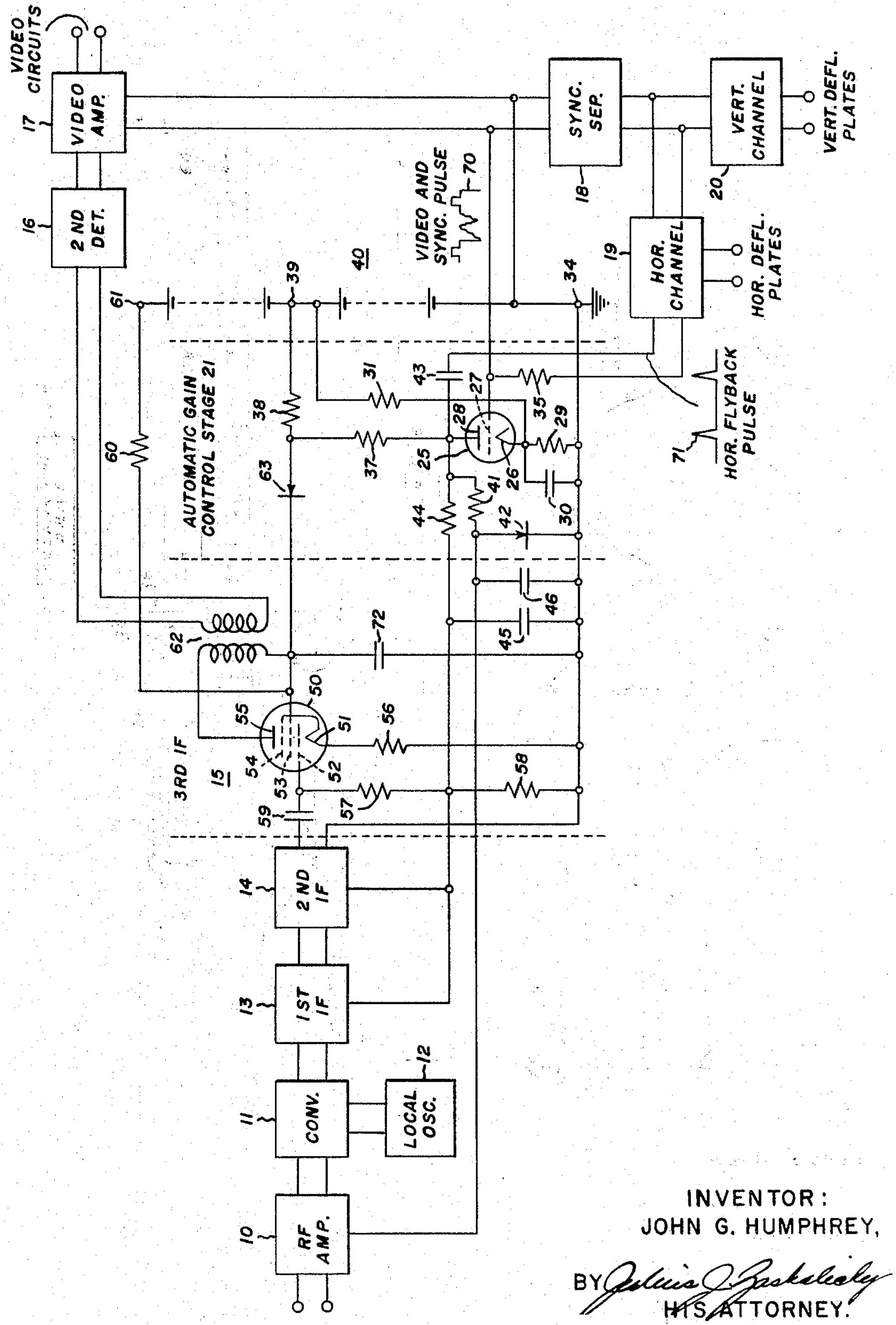
INVENTOR:
JOHN G. HUMPHREY,
BY Julius J. Zaskalicky
HIS ATTORNEY.

United States Patent Office 3,301,951
Patented Jan. 31, 1967

3,301,951
NON-BLOCKING KEYED AUTOMATIC GAIN CONTROL SYSTEM

John G. Humphrey, Mattydale, N.Y., assignor to General Electric Company, a corporation of New York
Filed Nov. 18, 1963, Ser. No. 324,301
1 Claim. (Cl. 178—7.3)

The present invention relates to an automatic gain control system, and in particular relates to keyed automatic gain control circuits.

Keyed automatic gain control circuits are commonly used in television receivers to vary the gain of the RF and IF stages of the television receiver inversely in accordance with the detected signal so as to provide a constant peak to peak video amplitude.

One form of such circuit employs an electron discharge device commonly referred to as a keyer. The detected video signal of positive polarity is applied between the grid and cathode circuit of the device and simultaneously a pulse of positive polarity coincident with the fly back period and of large amplitude is applied between the anode and cathode thereof developing an output across a load impedance whose unidirectional or average value varies in accordance with the peak to peak amplitude of the detected video signal. Such output is filtered and is applied in conjunction with a reference potential to the RF and IF stages of the receiver to vary the gain thereof so as to maintain the output of the detector relatively constant. When a weak signal is received by the receiver, the gain of the RF and IF stages is quite high so as to develop the necessary peak to peak video voltage at the output of the detector to maintain such high gain. Conversely, when the signal appearing at the output of the RF amplifier is strong, the gain of the RF and IF stages is low.

It has been found in television receivers constituted as described that when such receiver is switched from one channel of transmission from which a weak signal is received at the input of the receiver to another channel from which a strong signal is received, that the output from the last IF stage does not correspondingly increase; and consequently the detector does not develop an incremental change in output so as to effect a corresponding change in the inverse direction in the gain of the RF and IF stages so as to accommodate the receiver to the new signal and becomes disabled. The reasons for such behavior are believed to be due to delays in various parts of the receiver due to the nature of the circuit element used and to nonlinearities in the amplification characteristics of the various electron discharge devices thereof, in particular, the last stage of the IF channel. It has been found that under strong signal conditions the combined screen grid and plate current flowing in the last IF stage increases to large magnitudes. In accordance with the present invention utilization is made of this current change to alter the gain control voltage applied to the RF and IF stages during its existence so as to bring the gain of these stages to their normal strong signal values immediately. With such an arrangement the potentials in the normal mode of operation of the automatic gain control circuit adjust themselves to the new condition.

Accordingly, an object of the present invention is to provide an automatic gain controlling circuit of high reliability.

Another object of the present invention is to provide an automatic gain controlling circuit which rapidly accommodates itself to a variety of received signal conditions without temporary or permanent disability.

The novel features believed characteristic of the invention are set forth in the appended claims. The invention itself, together with further objects and advantages thereof may best be understood by reference to the following description taken in connection wtih the accompanying drawing which shows a portion of a television receiver with some of the stages thereof in block form, and other portions thereof in schematic form.

Referring now to the drawing there is shown a portion of a television receiver including an RF (radio frequency) amplifier 10, a converter 11, a local oscillator 12, a first IF (intermediate frequency) stage 13, a second IF stage 14, a third IF stage 15, a second detector stage 16, and a video amplifier 17. A television signal appearing at the input of the RF amplifier 10 is amplified, converted by the converter and local oscillator into intermediate frequency carrier wave modulated by the video signal. The intermediate frequency signal is amplified in the first, second and third intermediate frequency stages of the IF channel. The video signal from the third IF stage 15 is demodulated by the second detector 16, amplified by the video amplifier 17, and then applied to the video circuits of the television receiver. The amplified video output is also applied to a synchronizing signal separator 18 which removes the horizontal and vertical synchronizing pulses therefrom, and applies them, respectively, to the horizontal and vertical sweep channels 19 and 20 of the television receiver.

In the circuit of the drawing an automatic gain control stage 21 is connected between the output of the video amplifier 17 and the input of the RF and IF stages to control the gain thereof inversely in accordance with the amplitude of the output. In this stage the automatic gain control voltage is obtained from the video signal on a horizontal line to line sampling basis. Such arrangements are referred to as keyed automatic gain control systems. The keying function is effected by means of the automatic gain control keyer comprising an electron discharge device 25 having a cathode 26, a grid 27, and an anode 28. The cathode 26 is connected through a cathode resistor 29, by-passed by capacitor 30, to ground. The cathode 26 is also connected through a voltage dropping resistor 31 to positive terminal 39 of source 40, the negative terminal 34 of which is connected to ground. The voltage dropping resistor 31 is of such magnitude as to maintain proper steady state bias on the cathode 26. The grid 27 is connected to the output of the video amplifier 17. The anode 28 is connected through resistor 37 and resistor 38 in series to the positive potential point 39 of source 40 of a unidirectional potential. The anode 28 is also connected through resistor 41 to the anode of unilaterally conducting device 42, the cathode of which is connected to ground. The anode 28 is also connected through coupling capacitor 43 to a point in the horizontal sweep channel at which fly back voltage pulses 71 appear such that such pulses of large amplitude are applied between the anode 28 and cathode 26 of the device 25. The anode 28 is also connected through a series dropping resistor 44 into the grid cathode circuit of the IF stages. The voltage appearing at the input of the IF stages is filtered by capacitor 45. Similarly the voltage appearing at the input of the RF stage is filtered by capacitor 46.

The third or last IF stage 15 of the IF channel comprises an electron discharge device 50 including a cathode 51, a grid 52, a screen grid 53, a suppressor grid 54, and an anode 55. The cathode 51 is connected through a cathode biasing resistor 56 to ground. The grid 52 is connected through series combination of resistors 57 and 58 to ground. The junction point of resistors 57 and 58 is connected through resistor 44 to anode 28 of the device 25. The grid 52 is also connected through coupling capacitor 59 to the output of the second IF stage 14. The screen grid 53 is connected through load resistor 60 to positive potential point 61 on source 40. The screen is also by-passed to ground by capacitor 72. The supressor grid 54 is connected to the cathode 51. The anode 55 is connected through the primary winding of an IF transformer 62 to the screen grid 53. The secondary winding of the IF transformer 62 is connected in circuit to the input of the second detector 16. A unilaterally conducting device 63 is connected between the screen grid 53 and the junction point of resistors 37 and 38, and is poled to pass current from the junction point to the screen electrode 53.

The operation of the AGC stage 21 will first be considered under strong signal conditions and thereafter under weak conditions. Upon the appearance of a strong signal at the input of the receiver the output 70 appearing at the output terminals of the video amplifier 17 has a certain peak to peak amplitude which is greater than required. Such output is applied between the grid 27 and ground of the AGC keyer device 25. The bias of the cathode 26 may be of the order of 15 volts, for example. Simultaneously, horizontal fly back pulses 71 having an amplitude, for example of 150 volts are also applied between the anode 28 and ground. Accordingly, during the pulse interval a large current is caused to flow through the AGC keyer device 25 which builds up a charge on the capacitor 43 with the electrode adjacent the anode 28 negative with respect to the other electrode thereof. Upon the disappearance of the horizontal fly back pulse the potential at the anode 28 drops negative with respect to ground. The voltage divider network consisting of resistors 37 and 38, and 41 in series with the unilaterally conducting device 42, and particularly resistors 37 and 41 are set to provide proper automatic gain control bias on the RF and IF stages. If the video signal 70 is smaller than desired, less negative bias than with a stronger signal appears at the anode 28. Accordingly, the gain of the RF and IF stages is increased to provide the proper peak to peak output at the video amplifier 17. The unilaterally conducting device 42 prevents the grids of the RF and IF stages to which the AGC voltage is connected to rise above ground potential, thereby avoiding possible damage to these stages. The capacitors 45 and 46 provide the necessary filtering of the voltage before being applied to these stages.

It has been found that the automatic gain control channel does not respond quickly to apply the proper bias voltages to the RF and IF stages in accordance with requirements of strong signal conditions when the RF amplifier is suddenly switched to such a source. It has also been found that when this switching action occurs the output from the third IF stage does not increase as required. However, the current flowing in the screen and plate circuits increases to large magnitudes. These conditions are believed due to lag in charging and discharging of various capacitances in the stages involved and also to non-linearities in the IF amplifier stages. Under these circumstances the detector 16 doesn't experience any change in output. Accordingly, the automatic gain control feed back channel can not be brought into operation to effect a change in the bias conditions required by the strong signal. Consequently, the receiver becomes locked or disabled on the strong signal channel.

In accordance with the present invention utilization is made of the phenomena of the concurrent increase of screen and anode current of the third or last IF stage to effect instantaneously a change in the bias of the RF and IF stages. In accordance with the new strong signal requirements such change is accomplished by the provision of the diode 63 between the screen grid 53 of the third IF stage and the junction resistors 37 and 38. The diode 63 is poled to conduct current in the direction of the screen grid. The voltage dropping resistor 38 is placed in series with the conduction path of the diode 63 and the positive potential point 39 to enable a considerably lower voltage to be applied to the anode of device 25 and hence to the RF and IF stages to reduce the gain thereof and eliminate the disabled condition. The screen load resistance 60 is selected so as to provide the proper low voltage on the screen, for example 50 volts under the aforementioned disabled condition when the device utilized is a type 6EJ7 tube. Normally the voltage applied at point 39 would be of the order of 150 volts. As soon as the gain of a particular RF stage is reduced, the potential at the screen rises, the diode 63 becomes non-conductive, and the automatic gain control channel functions as normally expected.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but will be defined in the following claim.

What I claim as new and desire to secure by Letters Patent of the United States is:

In a television receiver a channel including a plurality of stages for amplifying a carrier modulating video signal, the last stage including an electron discharge device having a cathode, a grid, a screen grid, a suppressor grid and an anode connected as an intermediate frequency amplifier with output being derived between the anode and the screen electrodes thereof, a detector for deriving a video signal from the output of said channel, means for deriving a unidirectional voltage from the output of said detector varying in magnitude in accordance with the amplitude of said video signal, said last stage drawing large screen and anode currents during the coincidence of high gain and strong signal conditions, an automatic gain control stage, means for applying horizontal synchronizing pulses and the output of said detector to said automatic gain control stage, means for deriving from said automatic gain control stage another unidirectional voltage which varies in magnitude in accordance with the peak amplitude of the video signal during the horizontal synchronizing interval, a resistance voltage divider having a pair of input and a pair of output terminals, means for applying said other unidirectional voltage across said input terminals, means for connecting the output terminal to the initial stage of said channel to control the gain thereof, means for applying said other unidirectional voltage to one of said divider input terminals in a polarity to vary the gain of said channel inversely in accordance with the amplitude of said video signal, means responsive to screen and anode currents to develop a third unidirectional voltage, means for applying said third voltage to said divider during the occurrence of said condition to change the magnitude of the output of said divider to produce low gain in said channel, whereby high gain and strong signal conditions in said channel which produce low video output therefrom are avoided.

References Cited by the Examiner

UNITED STATES PATENTS

| | | | |
|---|---|---|---|
| 2,885,473 | 5/1959 | Kraft | 178—7.3 |
| 2,889,400 | 6/1959 | Rogers | 178—7.3 |

DAVID G. REDINBAUGH, *Primary Examiner.*

J. McHUGH, R. L. RICHARDSON, *Assistant Examiners.*